US011931882B2

(12) United States Patent
Clapp

(10) Patent No.: US 11,931,882 B2
(45) Date of Patent: Mar. 19, 2024

(54) TOOL HOLDING SYSTEM

(71) Applicant: Guy Clapp, Fort Worth, TX (US)

(72) Inventor: Guy Clapp, Fort Worth, TX (US)

( * ) Notice: Subject to any disclaimer, the term of this patent is extended or adjusted under 35 U.S.C. 154(b) by 84 days.

(21) Appl. No.: 17/336,727

(22) Filed: Jun. 2, 2021

(65) Prior Publication Data

US 2022/0388148 A1 Dec. 8, 2022

(51) Int. Cl.

| | |
|---|---|
| ***A47B 81/00*** | (2006.01) |
| ***A47B 3/00*** | (2006.01) |
| ***A47B 3/04*** | (2006.01) |
| ***B25H 1/12*** | (2006.01) |
| ***B25H 3/04*** | (2006.01) |
| ***E05D 7/04*** | (2006.01) |

(52) U.S. Cl.
CPC ................. *B25H 3/04* (2013.01); *B25H 1/12* (2013.01); *E05D 7/04* (2013.01)

(58) Field of Classification Search
CPC ... B25H 3/04; B25H 3/00; B25H 1/12; B25H 3/003; B25H 3/06; B25H 1/04; E05D 7/0423; E05D 7/04; E05D 7/43; E05D 2007/0438; E05D 2007/0446; E05D 2007/0453; E05D 2007/0461; E05D 2007/0469; E05D 2007/0484; E05D 2007/0492; E05D 7/0009; E05D 7/0018; E05D 7/0027; E05D 7/1005; E05D 7/1011; E05D 7/1016; E05D 7/1044; E05D 7/105; E05D 7/1061; E05D 7/1066; E05D 2007/1027; E05D 5/127; H01F 7/0252; E05Y 2900/20
See application file for complete search history.

(56) References Cited

U.S. PATENT DOCUMENTS

| | | | | | |
|---|---|---|---|---|---|
| 2,733,113 | A * | 1/1956 | Humbargar | A47B 81/007 | 312/249.7 |
| 4,343,172 | A * | 8/1982 | Nordlund | B25H 3/04 | 211/70.1 |
| 4,527,303 | A * | 7/1985 | Civitelli | E05D 11/06 | 16/236 |
| 5,144,721 | A * | 9/1992 | Schade | E05D 7/0423 | 16/DIG. 43 |
| 5,339,493 | A * | 8/1994 | MacIntyre | E05D 7/0423 | 16/237 |
| 5,544,595 | A * | 8/1996 | Stephenson, III | E05D 11/0018 | 16/374 |
| 5,544,747 | A * | 8/1996 | Horn | B25H 3/06 | 211/DIG. 1 |
| 5,555,605 | A * | 9/1996 | Mosher | E05D 7/0423 | 16/245 |

(Continued)

FOREIGN PATENT DOCUMENTS

| | | | | |
|---|---|---|---|---|
| DE | 19707594 A1 * | 10/1997 | E05D 11/00 |
| DE | 19855727 A1 * | 6/2000 | B24B 3/00 |

(Continued)

*Primary Examiner* — Kimberley S Wright
(74) *Attorney, Agent, or Firm* — Warren V. Norred; Alec Turung

(57) ABSTRACT

A tool holding system including a first tool holding mechanism. The first tool holding mechanism includes at least one first cavity, at least one second cavity, and a magnetic strip interposed between the at least one first cavity and the at least one second cavity. The first tool holding mechanism is coupled to a surface of the tool holding system.

17 Claims, 12 Drawing Sheets

(56) References Cited

U.S. PATENT DOCUMENTS

| | | | | | |
|---|---|---|---|---|---|
| 5,641,079 | A * | 6/1997 | Schmidt | A47F 5/0823 | 211/104 |
| 5,694,665 | A * | 12/1997 | Strickland | E05D 7/0423 | 16/237 |
| 5,760,668 | A * | 6/1998 | Testa | B23Q 3/1546 | 211/DIG. 1 |
| 6,286,185 | B1 * | 9/2001 | Ramsauer | E05D 7/04 | 16/236 |
| 6,811,127 | B1 * | 11/2004 | Shiao | B25H 3/04 | 211/DIG. 1 |
| 7,172,079 | B1 * | 2/2007 | Shiao | B25H 3/04 | 206/379 |
| 7,360,279 | B2 * | 4/2008 | Hoffmann | E05D 7/04 | 16/382 |
| 8,573,415 | B2 * | 11/2013 | Ernst | B25H 3/04 | 248/220.21 |
| 9,210,996 | B1 * | 12/2015 | Kramer | A46B 17/02 | |
| 10,207,401 | B1 * | 2/2019 | Pedrin | B25H 3/003 | |
| 10,932,593 | B2 * | 3/2021 | Altizer | A47F 5/0815 | |
| 2004/0031815 | A1 * | 2/2004 | Wertheim | B67D 7/32 | 222/153.01 |
| 2004/0129658 | A1 * | 7/2004 | LeClerc | A47F 7/0028 | 312/902 |
| 2004/0144739 | A1 * | 7/2004 | Marek | B25H 3/04 | 211/89.01 |
| 2005/0145587 | A1 * | 7/2005 | Matthews | B25H 3/04 | 211/70.1 |
| 2006/0026796 | A1 * | 2/2006 | Hoffmann | E05D 7/04 | 16/237 |
| 2006/0065563 | A1 * | 3/2006 | Schmidt | B25H 3/003 | 206/372 |
| 2008/0251476 | A1 * | 10/2008 | Shiao | B25H 3/04 | 211/70.6 |
| 2010/0314978 | A1 * | 12/2010 | Manalang | B25H 3/06 | 312/317.3 |
| 2015/0115786 | A1 * | 4/2015 | Manalang | A47B 31/00 | 312/294 |
| 2016/0263739 | A1 * | 9/2016 | Cole | B25H 1/12 | |

FOREIGN PATENT DOCUMENTS

| | | | | |
|---|---|---|---|---|
| DE | 202018001048 | U1 * | 7/2018 | |
| EP | 1213101 | A2 * | 6/2002 | B25H 3/00 |
| FR | 2730279 | A1 * | 8/1996 | B25H 3/04 |
| GB | 1543383 | A * | 4/1979 | B25H 3/04 |

* cited by examiner

TOOL HOLDING SYSTEM

FIELD OF THE INVENTION

The present invention relates to a tool holding system and, more specifically, to tool boxes and tool walls.

BACKGROUND

Tool boxes are used in a variety of configurations and purposes. Some tool boxes are configured to maximum storage in a compact container. Other tool boxes are configured to store higher quantities of tools.

Storage mechanisms may be configured to be easily accessible for tools that are used often. However, easily accessible storage mechanisms lack security and significant restraining features that prevent tools from being stolen as well as becoming loose floating items in a tool enclosure.

SUMMARY OF THE INVENTION

The present invention comprises a tool holding system including a first tool holding mechanism. The first tool holding mechanism includes at least one first cavity, at least one second cavity, and a magnetic strip interposed between the at least one first cavity and the at least one second cavity. The first tool holding mechanism is coupled to a surface of the tool holding system.

In another embodiment, the present invention comprises a tool holding system including a tool box. The tool box includes a surface, a first tool holding mechanism coupled to the surface, at least one door coupled to the tool box using a hinge, and at least one door stop mechanism coupled to the tool box. The first tool holding mechanism includes at least one first cavity, at least one second cavity, and a magnetic strip interposed between the at least one first cavity and the at least one second cavity. The hinge is coupled to the tool box using at least one removable screw and at least one irremovable screw. The hinge is coupled to the door using at least one removable screw and at least one irremovable screw.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprises" and "comprising", when used in this specification, specify the presence of stated features, steps, operations, elements, and components, but do not preclude the presence or addition of one or more other features, steps, operations, elements, components, or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention, and is not intended to limit the invention to the specific embodiments illustrated by the figures or description below.

Figure 1:
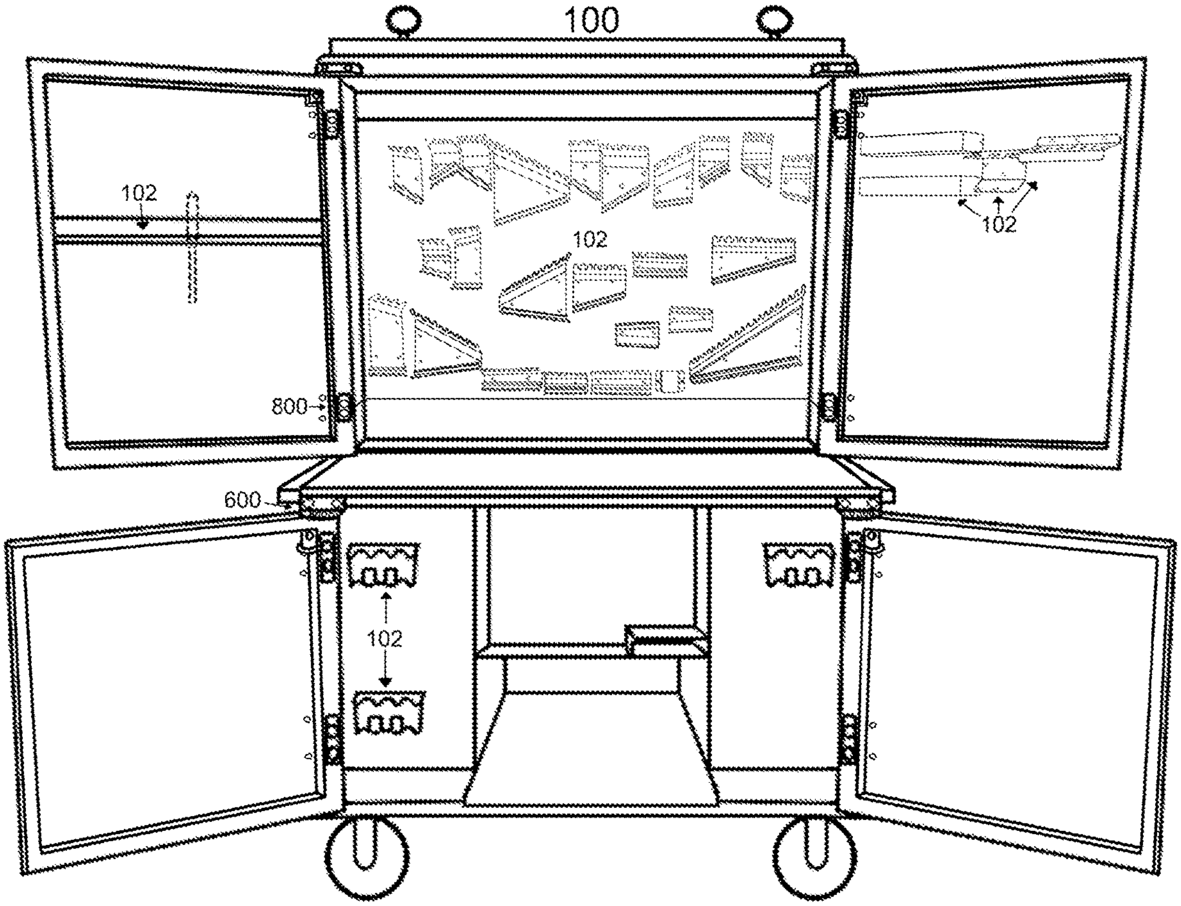
FIG. 1 is a front perspective of a tool box.

The present invention will now be described by referencing the appended figures representing preferred embodiments. FIG. 1 depicts a front perspective of a tool box 100. The tool box 100 may comprise Tool Holding Mechanism Variants 102, at least one door, at least one door stop mechanism 600, and at least one hinge 700.

In one embodiment, the tool box 100 may comprise multiple tiers, each tier comprising storage capacity for tool holding mechanisms. One of ordinary skill in the art will appreciate that the tool box 100 may comprise a variety of combinations and quantities of different tool holding mechanisms.

Figure 2:
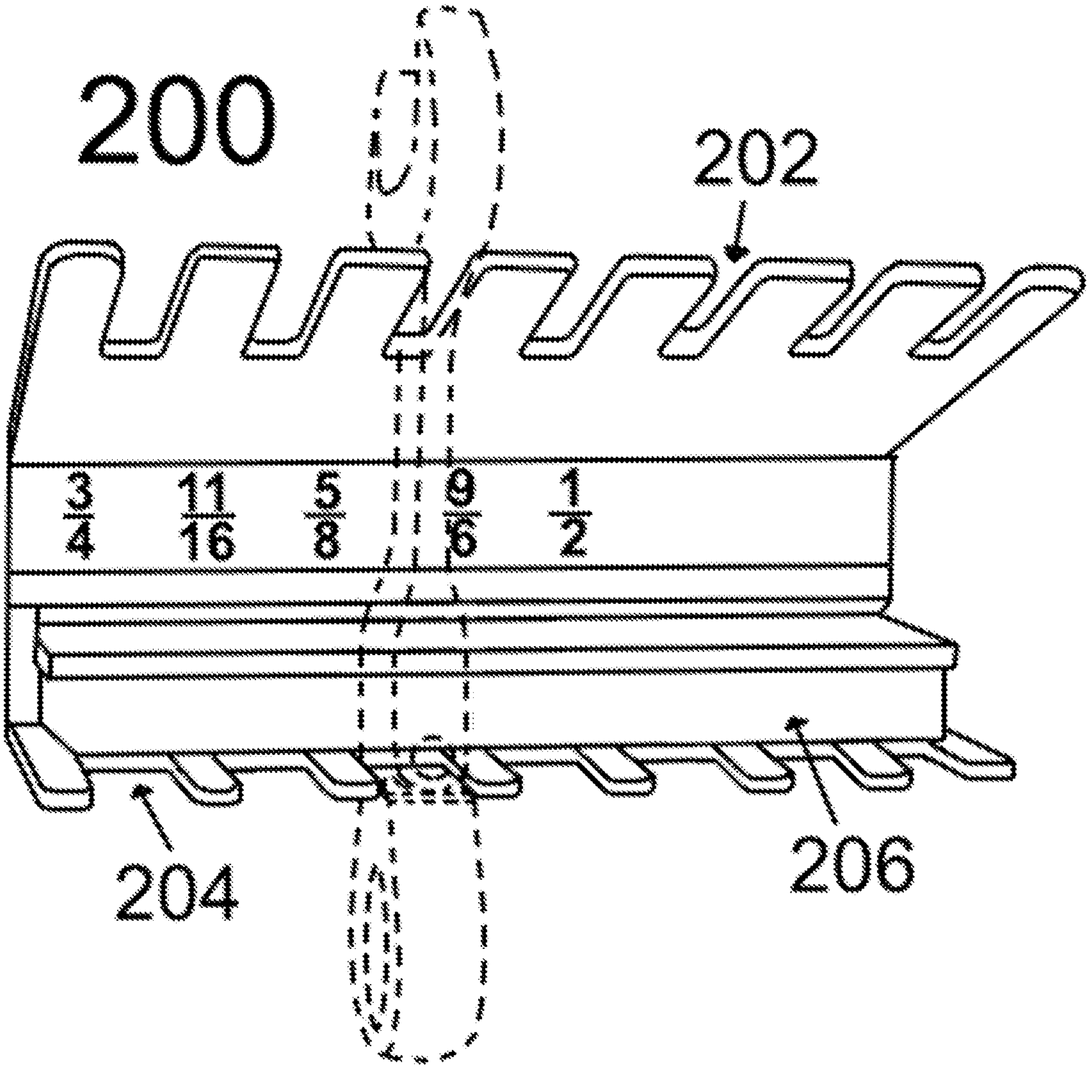
FIG. 2 is a front perspective of a first tool holding mechanism.

FIG. 2 depicts a front perspective of a first tool holding mechanism 200. In one embodiment, the first tool holding mechanism 200 may comprise a first cavity 202, a second cavity 204, and a magnetic strip 206 interposed between the first cavity 202 and the second cavity 204. The magnetic strip 206 may be disposed in a configuration that allows a tool that is placed in the first cavity 202 and the second cavity 204 to magnetically couple to the magnetic strip 206.

The first cavity 202 may comprise a width that allows a first portion of a tool to pass into the first cavity 202. The second cavity 204 may comprise a width that allows a second portion of the tool to pass into the second cavity 204. In one embodiment, the width of the first cavity 202 may be substantially the same as the width of the second cavity 204. In another embodiment, the width of the first cavity 202 may be different than the width of the second cavity 204. One of ordinary skill in the art will appreciate that different widths are realized for different tools. The first tool holding mechanism 200 may be configured to receive a custom set of tools. One of ordinary skill in the art will also appreciate that the first tool holding mechanism 200 may be configured to comprise a plurality of same or different first cavities 202 and second cavities 204.

In one embodiment, the magnetic strip 206 may be disposed substantially closer to the second cavity 204 than to the first cavity 202. One of ordinary skill in the art will appreciate that the magnetic strip 206 may be interposed at any location between the first cavity 202 and the second cavity 204.

In one embodiment, the first tool holding mechanism 200 may comprise a single piece of material, such as, but not limited to, aluminum. The single piece of material may be bent at two locations to form an upper shelf and a lower shelf. In one embodiment, the bends may be configured to create angles that are at least substantially equal to, or greater than, ninety-degrees. In one embodiment, the upper shelf may comprise the first cavity 202 and the lower shelf may comprise the second cavity 204.

The first tool holding mechanism 200 may be coupled to a surface of the tool box 100. In one embodiment, the surface may be an internal surface of the tool box 100. In one embodiment, the surface may an internal surface of the door of the tool box 100.

Figure 9:
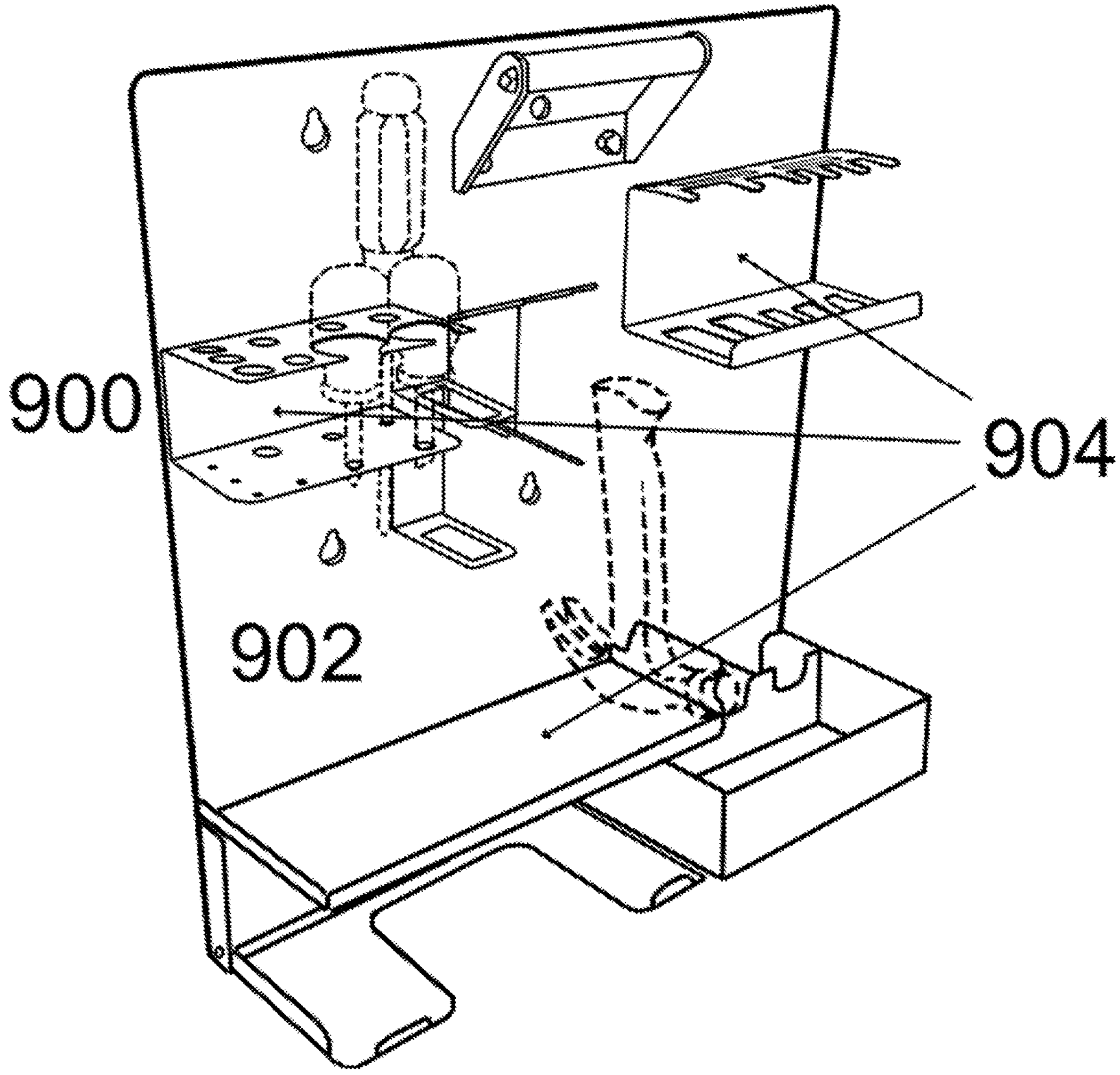
FIG. 9 is a side perspective of a tool wall.

In one embodiment, the first tool holding mechanism 200 may be coupled to a surface of a tool wall, such as the tool wall 900 of FIG. 9.

In one embodiment, the first tool holding mechanism 200 may comprise a back surface, a top surface comprising the at least one first cavity 202 and configured to project out from the back surface, forming at least a ninety-degree angle between the back surface and the top surface, and a bottom surface comprising the at least one second cavity 204 and configured to project out from the back surface, forming at least a ninety-degree angle between the back surface and the bottom surface.

Figure 3:
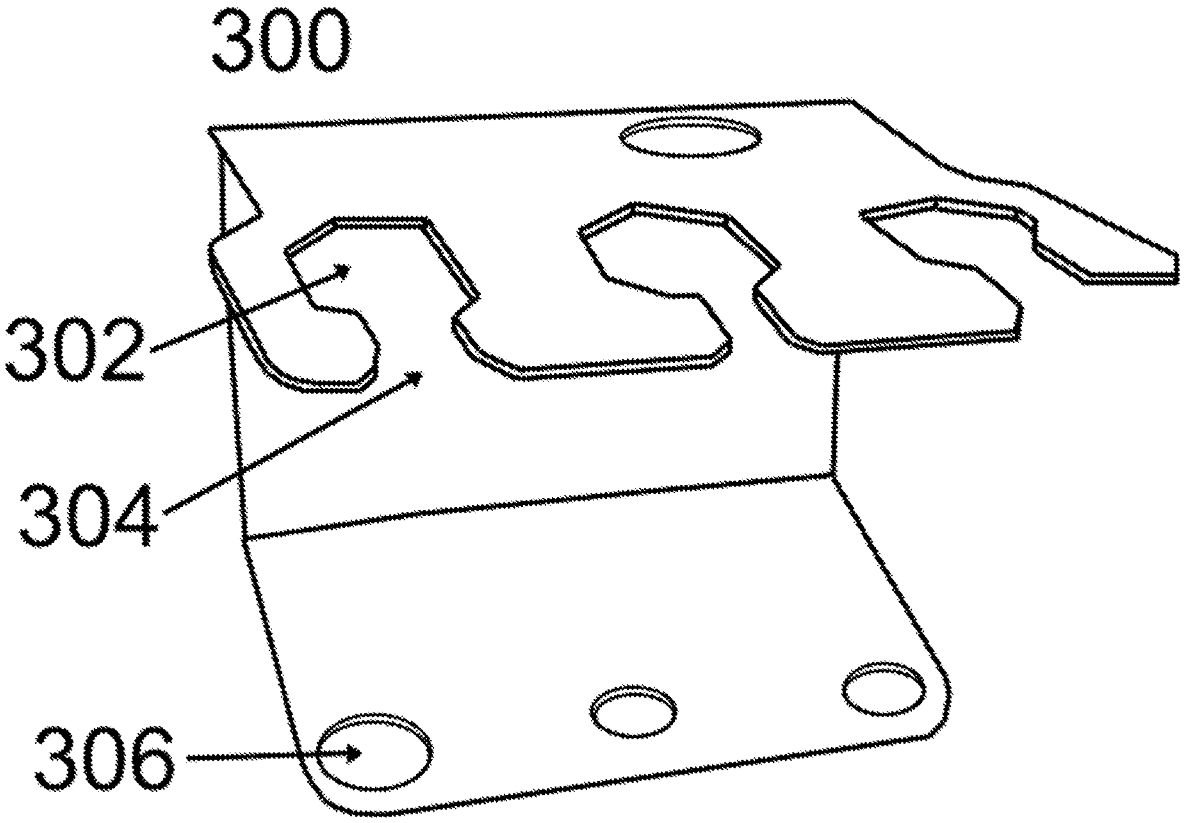
FIG. 3 is a front perspective of a second tool holding mechanism.

FIG. 3 depicts a front perspective of a second tool holding mechanism 300. In one embodiment, the second tool holding mechanism 300 may comprise an upper cavity and a lower cavity 306. The upper cavity may comprise a first portion 302 and a second portion 304.

The first portion 302 of the upper cavity may comprise a width greater than a width of the second portion 304 of the upper cavity. The first portion 302 may be internal to the second portion 304 so that the second portion 304 may form a channel to the first portion 302.

The width of the first portion 302 of the upper cavity may be smaller than a first width of a tool. In one embodiment, the first width of the tool may be a width of a first portion of a handle of the tool. The width of the first portion 302 of the upper cavity and the width of the second portion 304 of the upper cavity may be greater than a second width of the tool. In one embodiment, the second width of the tool may be a width of a second portion of the handle of the tool.

In one embodiment, a user may pass the second portion of the handle through the second portion 304 of the upper cavity and then set the first portion of the tool into the first portion 302 of the upper cavity.

The lower cavity 306 may comprise a width greater than a width of an operational portion of the tool. In one embodiment, in response to the user setting the first portion of the handle of the tool into the first portion 302 of the upper cavity, the operational portion of the tool may set into the lower cavity 306.

The second tool holding mechanism 300 may be coupled to a surface of the tool box 100. In one embodiment, the surface may be an internal surface of the tool box 100. In one embodiment, the surface may an internal surface of the door of the tool box 100.

In one embodiment, the second tool holding mechanism 300 may be coupled to a surface of a tool wall, such as the tool wall 900 of FIG. 9.

Figure 4:
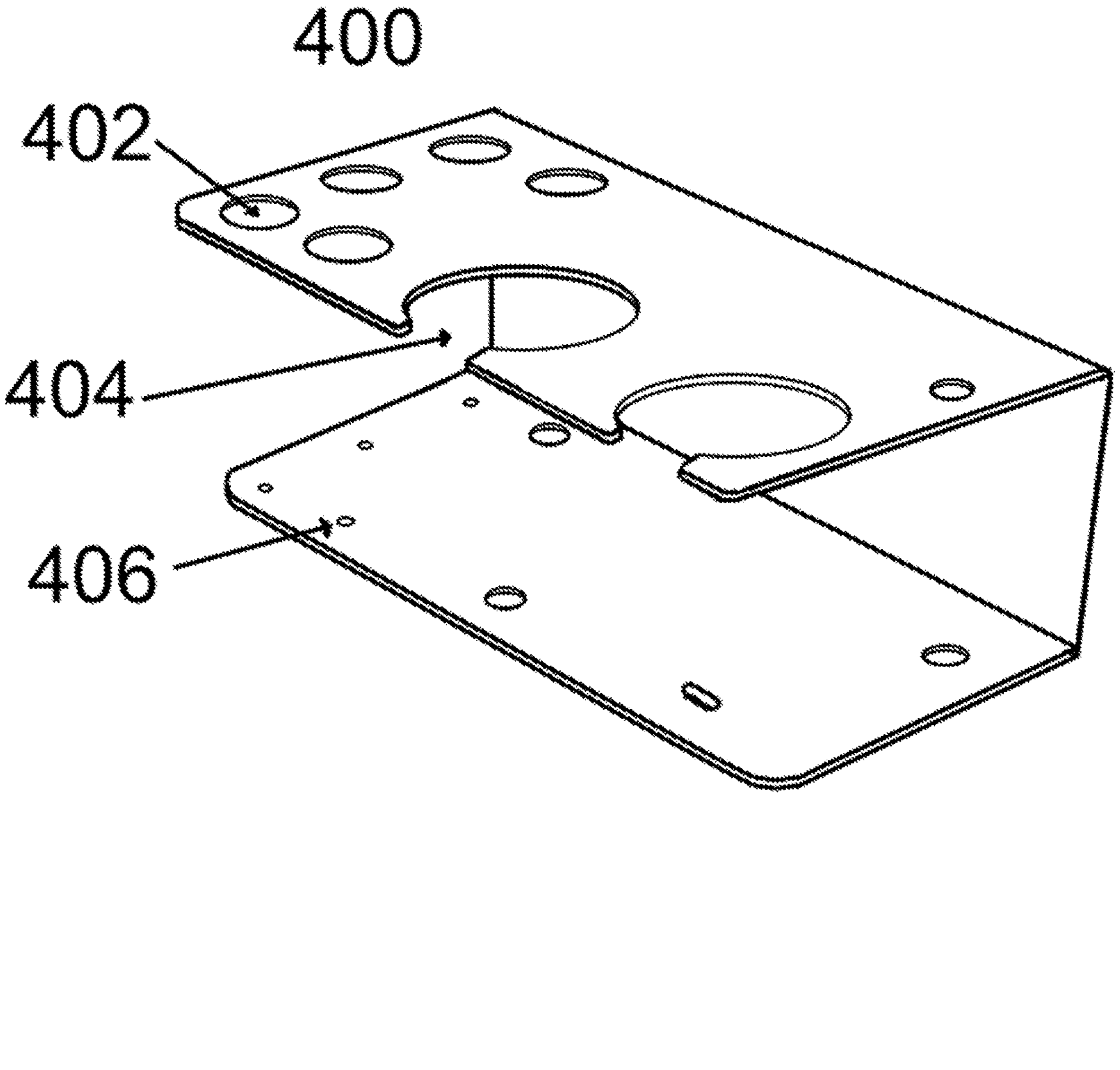
FIG. 4 is a front perspective of a third tool holding mechanism.

FIG. 4 depicts a front perspective of a third tool holding mechanism 400. The third holding mechanism 400 may comprise a first type of upper cavity 402, a second type of upper cavity 404, and a lower cavity 406. The second type of upper cavity 404 may be the upper cavity of FIG. 3.

The first type of upper cavity 402 may be internal to an upper portion of the third tool holding mechanism 400. The second type of upper cavity 404 may be exposed to a space external to the upper portion of the third tool holding mechanism 400 such that a tool may laterally pass into the second type of upper cavity 404.

One of ordinary skill in the art will appreciate that a variety of types and quantities of cavities may be configured into the third tool holding mechanism. One of ordinary skill in the art will also appreciate that the configuration may be relative to a set of tools.

The third tool holding mechanism 400 may be coupled to a surface of the tool box 100. In one embodiment, the surface may be an internal surface of the tool box 100. In one embodiment, the surface may an internal surface of the door of the tool box 100.

In one embodiment, the third tool holding mechanism 400 may be coupled to a surface of a tool wall, such as the tool wall 900 of FIG. 9.

Figure 5:
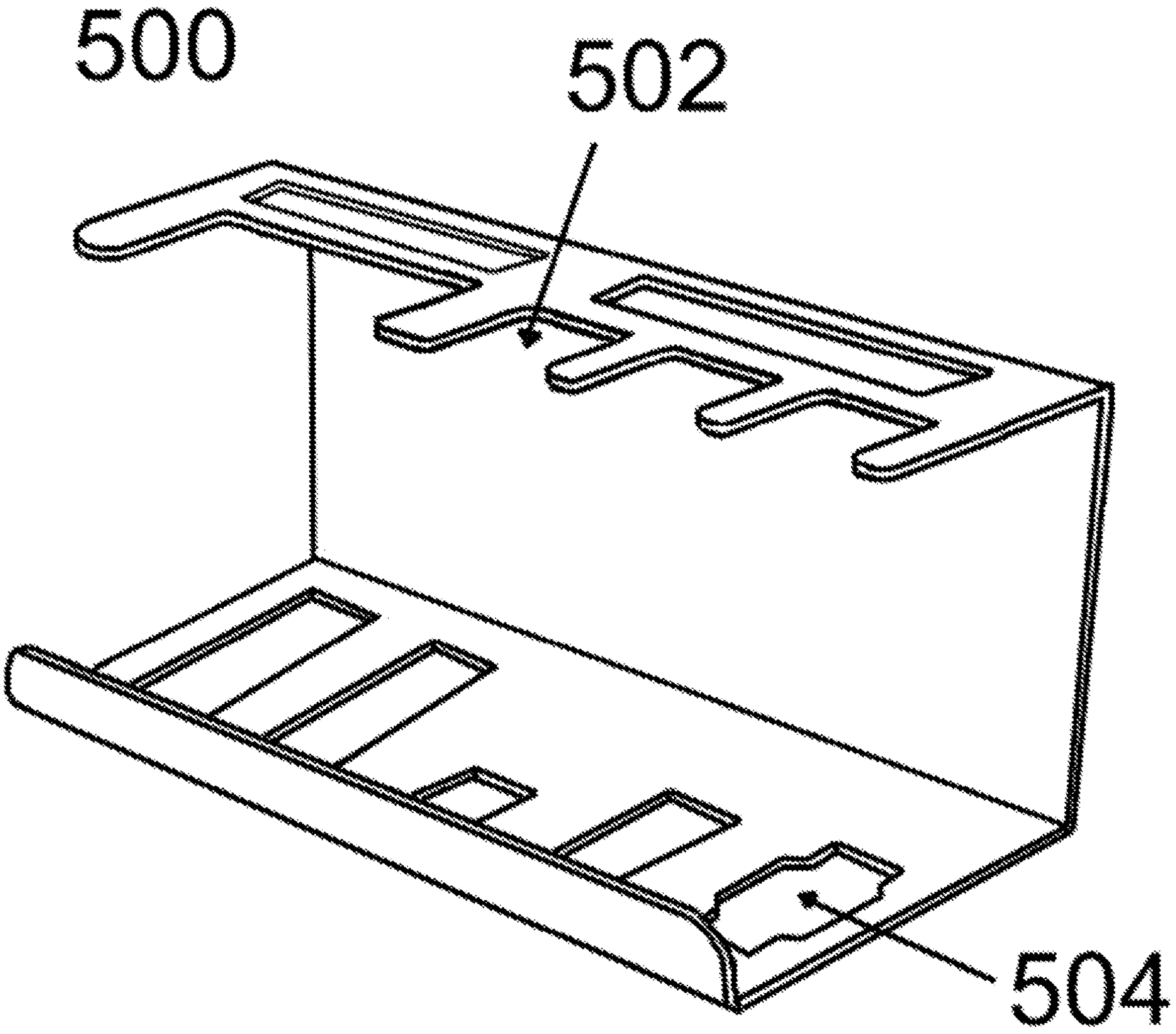
FIG. 5 is a front perspective of a fourth tool holding mechanism.

FIG. 5 depicts a front perspective of a fourth tool holding mechanism 500. The fourth tool holding mechanism 500 may comprise an upper cavity 502 and a lower cavity 504. The upper cavity 502 may be exposed to a space external to an upper portion of the fourth tool holding mechanism 500 such that a tool may laterally pass into the upper cavity 502. The lower cavity 504 may be internal to a lower portion of the fourth tool holding mechanism 500.

The fourth tool holding mechanism 500 may be coupled to a surface of the tool box 100. In one embodiment, the surface may be an internal surface of the tool box 100. In one embodiment, the surface may an internal surface of the door of the tool box 100.

In one embodiment, the fourth tool holding mechanism 500 may be coupled to a surface of a tool wall, such as the tool wall 900 of FIG. 9.

Figure 6:
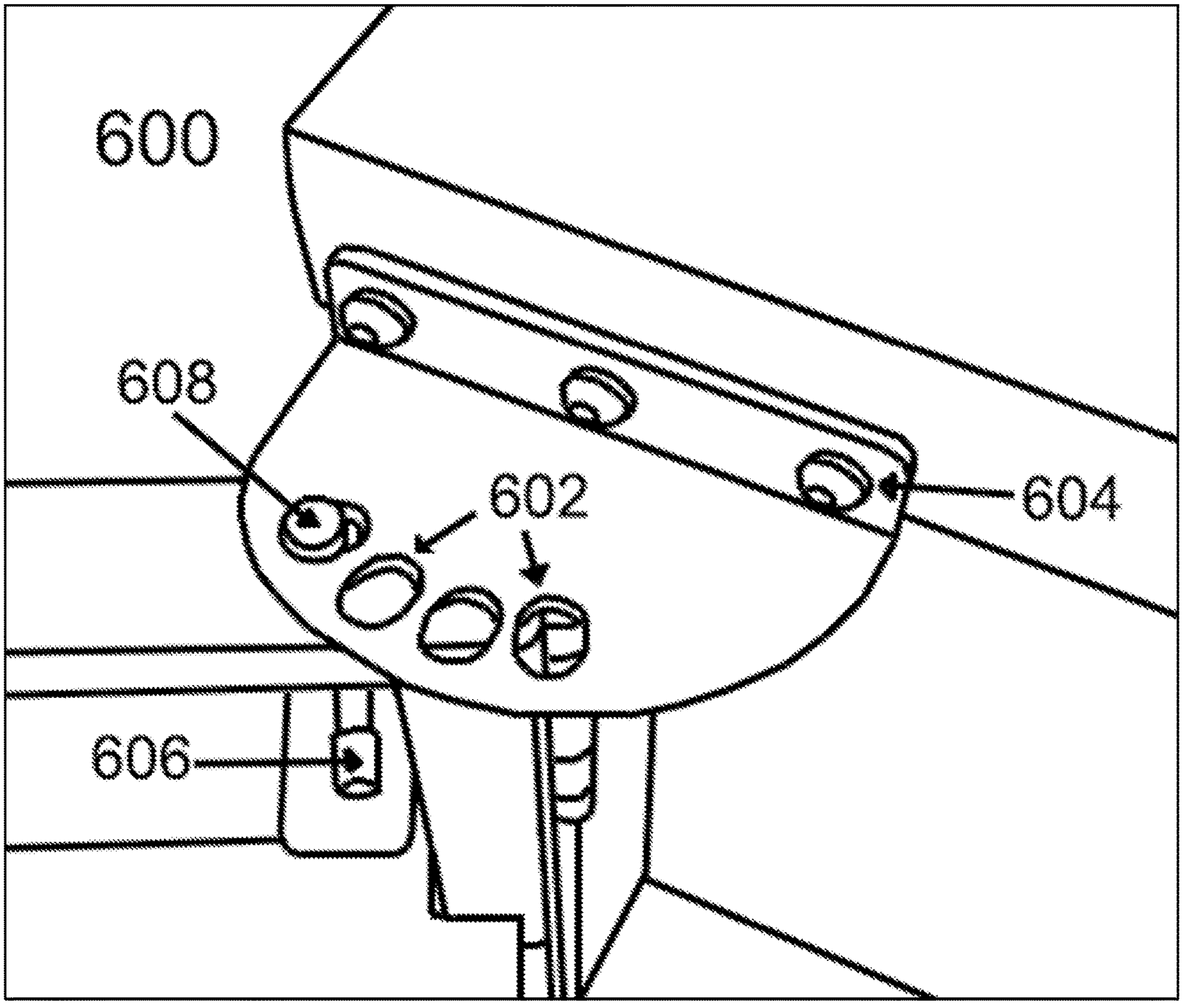
FIG. 6 is a top perspective of a door stop mechanism.

FIG. 6 depicts a top perspective of a door stop mechanism 600. In one embodiment, the door stop mechanism 600 may comprise a plurality of holes 602 configured to secure a door of a tool box at a plurality of open angles.

In one embodiment, at least one of the plurality of holes 602 may correspond with a closed position of the door. The door may comprise a stop 608 configured to protrude outward from a top side surface of the door and through at least one of the plurality of holes of the door stop mechanism.

The door stop mechanism 600 may be configured to secure the door at the plurality of open angles by receiving the stop 608 in one of the plurality of holes 602.

In one embodiment, the stop 608 may be configured to be controlled by a stop handle 606 disposed internal to the door.

Figure 7:
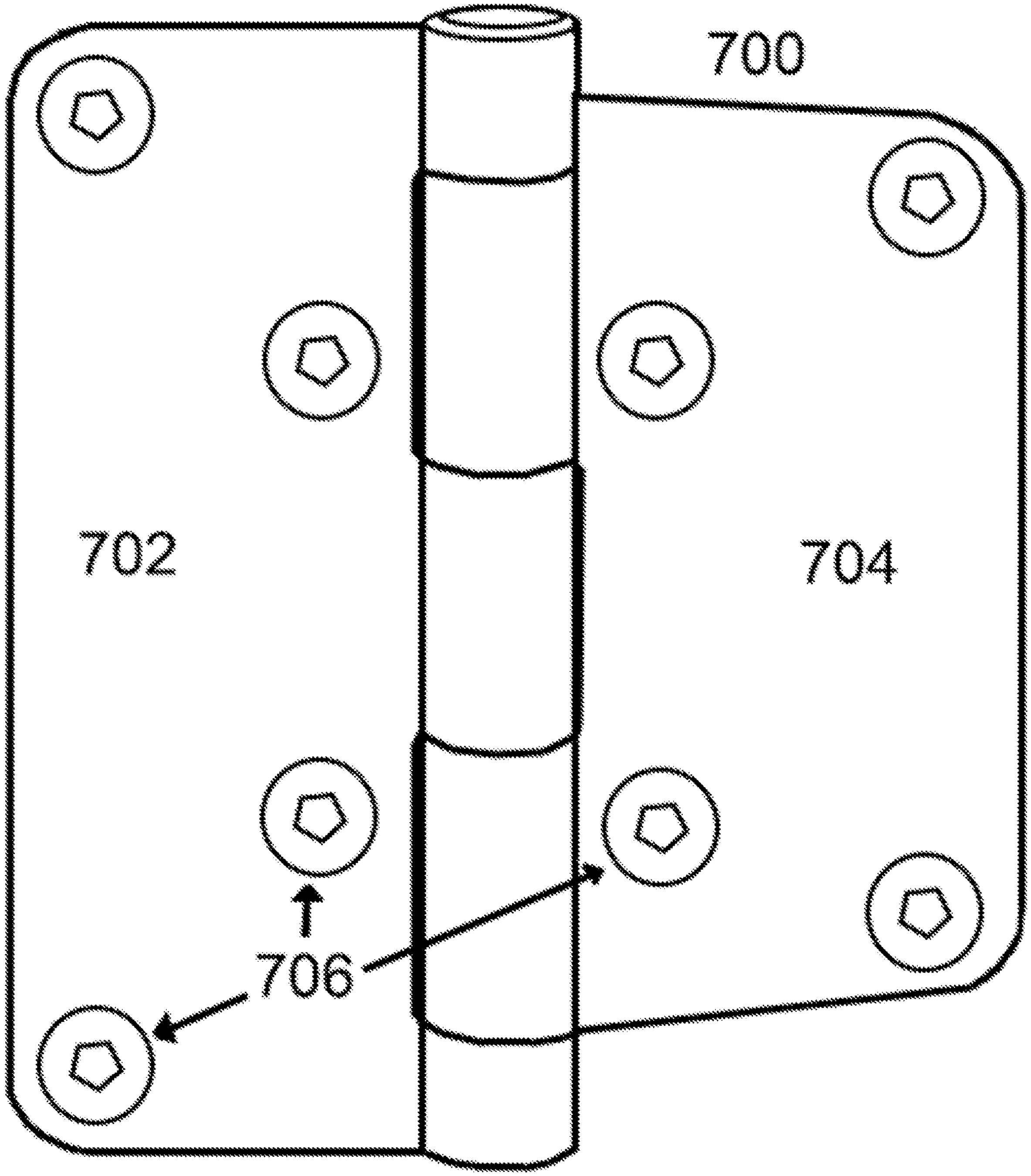
FIG. 7 is a front perspective of a hinge.

FIG. 7 depicts a front perspective of a hinge 700. In one embodiment, the hinge 700 may be the hinge featured in the hinge locking system 800 of FIG. 1. The hinge 700 may comprise a first side 702 coupled to a tool box and a second side 704 coupled to a door of the tool box. The first side 702 and second side 704 may be coupled to the tool box and door, respectively, using a plurality of screw 706.

Figure 8:
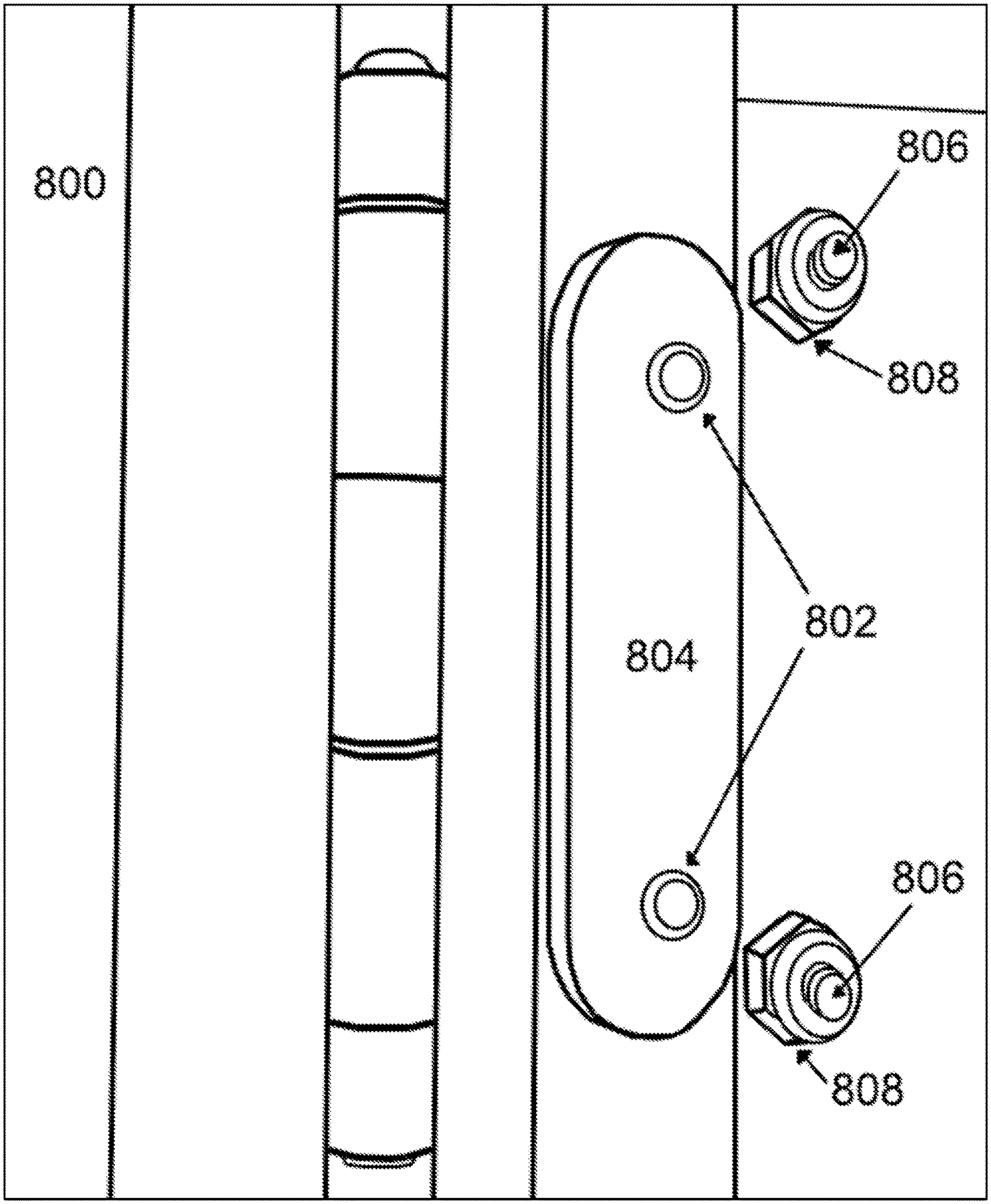
FIG. 8 is a back perspective of a hinge.

FIG. 8 depicts the hinge locking system 800 at a back perspective of a hinge 700. In one embodiment, the hinge locking system 800 may depict a back side of the second side 704 of the hinge 700 of FIG. 7. One of ordinary skill in the art will appreciate that a back side of the first side 702 of the hinge 700 of FIG. 7 may be substantially similar to the back side of the second side 704 of the hinge 700 of FIG. 7.

The hinge locking system 800 may comprise at least one first screw 802 captured by a secured surface 804 and at least one second screw 806 captured by a nut 808 on an opposite side of the tool box and door, respectively. the secured surface being at least one of:

In one embodiment, the secured surface 804 may be the door or tool box, respectively. In another embodiment, the secured surface 804 may comprise a material permanently coupled to the door or tool box, respectively.

FIG. 9 depicts a side perspective of a tool wall 900. The tool wall 900 may comprise a wall 902 and a plurality of tool holding mechanisms 904 coupled to the wall 902. In one embodiment, the plurality of tool holding mechanisms 904 may comprise at least one of the first tool holding mechanism 200 of FIG. 2, the second tool holding mechanism 300 of FIG. 3, the third tool holding mechanism 400 of FIG. 4, and the fourth tool holding mechanism 500 of FIG. 5.

Figure 10:
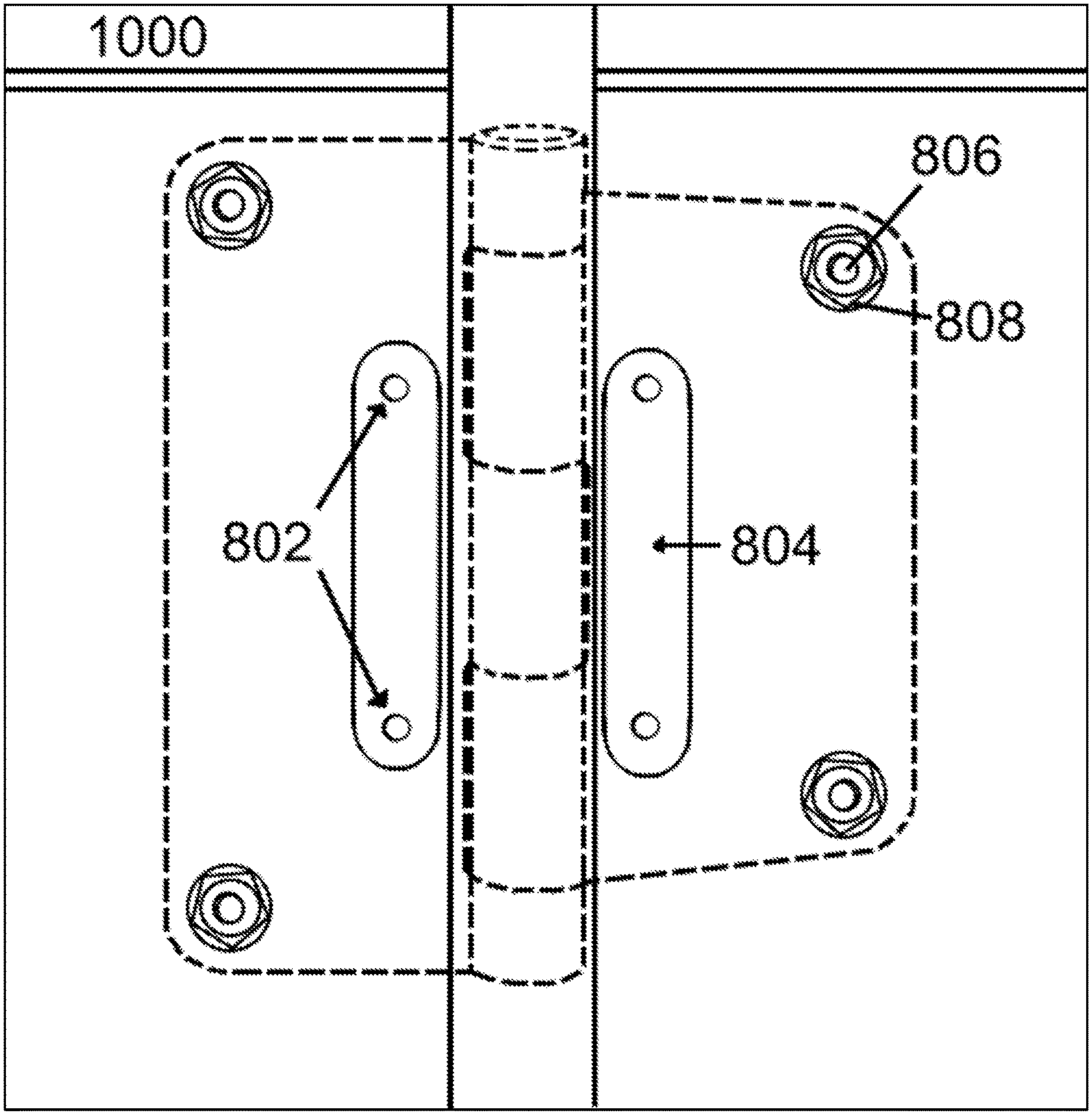
FIG. 10 is a back perspective of a hinge in the door.

FIG. 10 depicts the hinge locking system 800 at a back perspective of a hinge 700 while including the hinge 700 outline. In one embodiment, the hinge locking system 800 may depict a back side of the second side 704 of the hinge 700 of FIG. 7. One of ordinary skill in the art will appreciate that a back side of the first side 702 of the hinge 700 of FIG. 7 may be substantially similar to the back side of the second side 704 of the hinge 700 of FIG. 7.

The hinge locking system 800 may comprise at least one first screw 802 captured by a secured surface 804 and at least one second screw 806 captured by a nut 808 on an opposite side of the tool box and door, respectively. the secured surface being at least one of: In one embodiment, the secured surface 804 may be the door or tool box, respectively. In another embodiment, the secured surface 804 may comprise a material permanently coupled to the door or tool box, respectively.

In each embodiment, the hinge allows a user installing the door to an opening first using screws or bolts in such a way that the user can adjust the door's hinges. The user can repeatedly test the door's fit iteratively until the door is properly fitted to the frame. Once the user is satisfied that the door is properly fit to the frame, the user can use irremovable screws or locknuts to secure the door to the opening while the door is in an open position. This allows the door to be secure when it is closed as the hinges cannot be removed from the outside.

Figure 11:
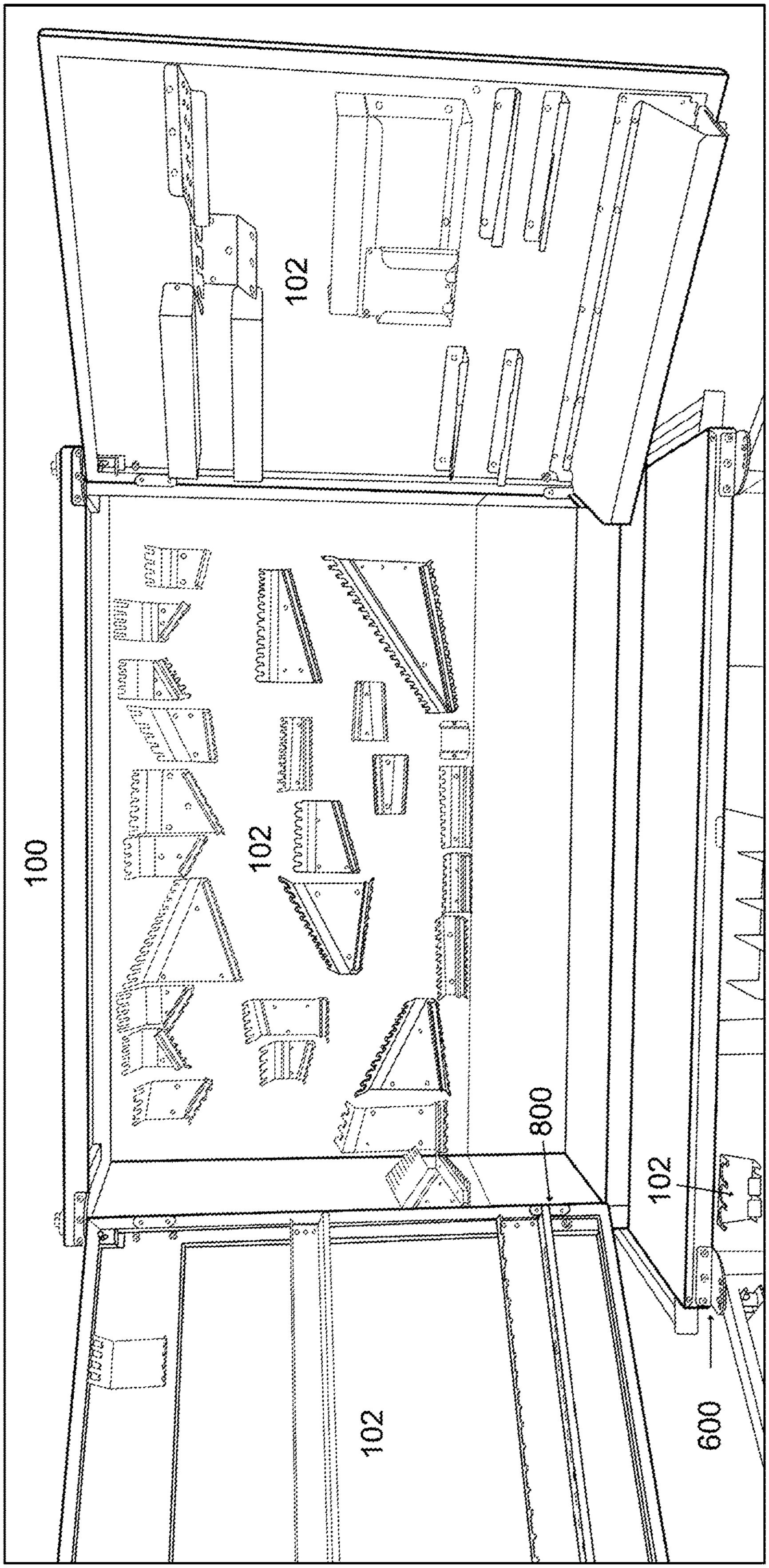
FIG. 11 is a front perspective view of the top half of the toolbox.

FIG. 11 depicts a perspective of the tool box 100. The tool box 100 may comprise a back wall and doors and a plurality of tool holding mechanism variants 102 coupled to the wall and doors. In one embodiment, the tool holding mechanism variants 102 may comprise at least one of the first tool holding mechanism 200 of FIG. 2, the second tool holding mechanism 300 of FIG. 3, the third tool holding mechanism 400 of FIG. 4, and the fourth tool holding mechanism 500 of FIG. 5. The tool box 100 also comprises the door stop mechanism 600, hinges 700, and the hinge locking systems 800.

Figure 12:
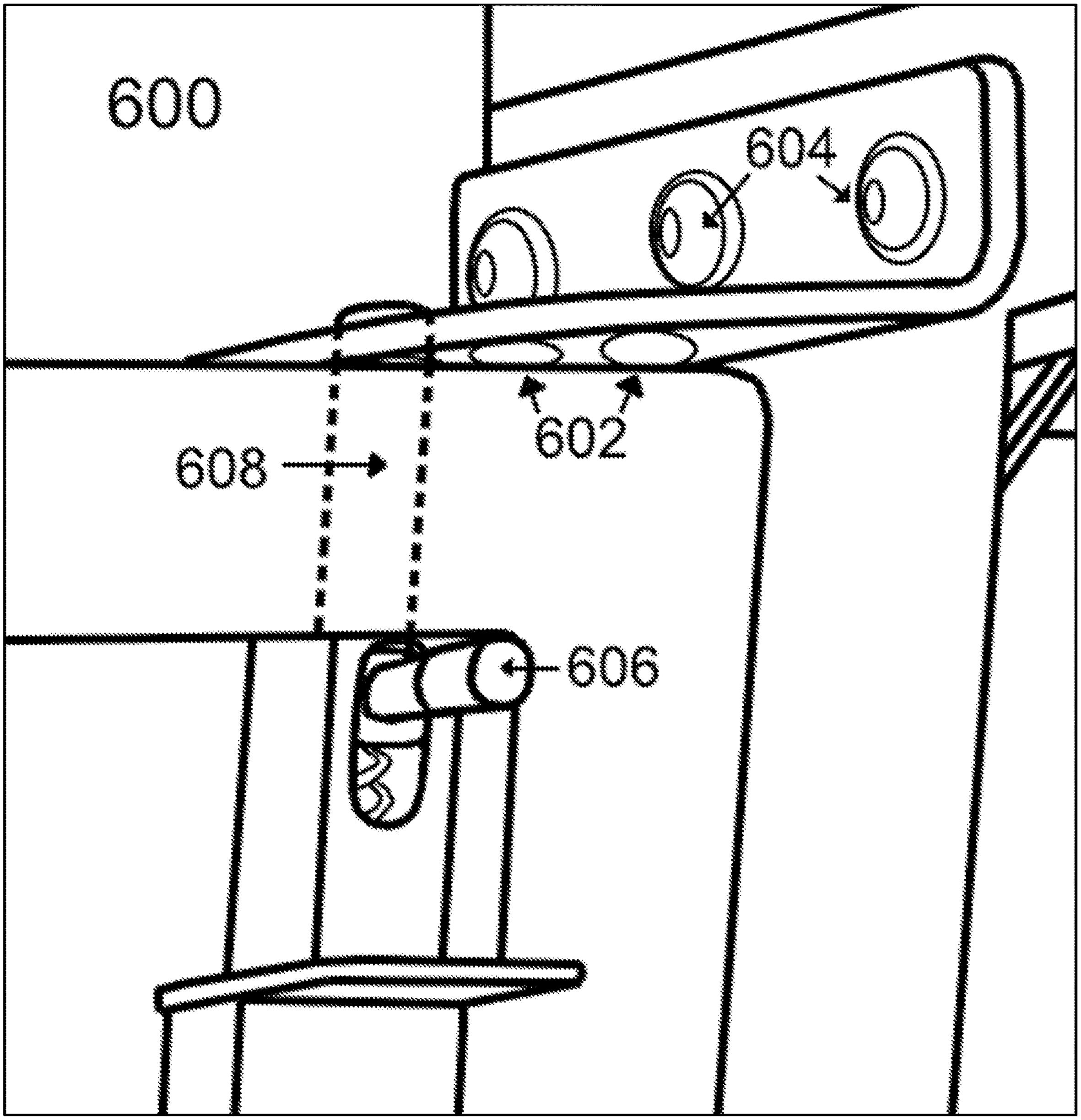
FIG. 12 is a perspective view of the door locking mechanism.

FIG. 12 depicts a side perspective of a door stop mechanism 600. In one embodiment, the door stop mechanism 600 may comprise a plurality of holes 602 configured to secure a door of a tool box at a plurality of open angles.

In one embodiment, at least one of the plurality of holes 602 may correspond with a closed position of the door. The door may comprise a stop 608 configured to protrude outward from a top side surface of the door and through at least one of the plurality of holes of the door stop mechanism.

The door stop mechanism 600 may be configured to secure the door at the plurality of open angles by receiving the stop 608 in one of the plurality of holes 602.

In one embodiment, the stop 608 may be configured to be controlled by a stop handle 606 disposed internal to the door.

A tool holding system may comprise at least one of a tool box and a tool wall.

In one embodiment, a tool holding system may comprise a tool box. The tool box may comprise a surface, a first tool holding mechanism coupled to the surface, at least one door coupled to the tool box using a hinge, and at least one door stop mechanism coupled to the tool box. The first tool holding mechanism may comprise at least one first cavity, at least one second cavity, and a magnetic strip interposed between the at least one first cavity and the at least one second cavity. The hinge may be coupled to the tool box using at least one removable screw and at least one irremovable screw. The hinge may be coupled to the door using at least one removable screw and at least one irremovable screw.

While this disclosure uses the phrase "irremovable screw", the phrase includes any device that would serve the purpose of affixing the door to a hinge or hinge to a door frame, including a bolt and nut combination or any other means for such fixation.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments.

While the invention has been described with reference to exemplary embodiments, it will be understood by those skilled in the art that various changes may be made and equivalents may be substituted for elements thereof without departing from the scope of the invention.

In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention.

In the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

Moreover, the use of the terms first, second, etc. do not denote any order or importance, but rather the terms first, second, etc. are used to distinguish one element from another.

A legend of components discussed herein follows:

Tool Box 100

Tool Holding Mechanism Variants 102

First Tool Holding Mechanism 200
First Cavity 202
Second Cavity 204
Magnetic Strip 206
Second Tool Holding Mechanism 300
First Portion of Upper Cavity 302
Second Portion of Upper Cavity 304
Second Tool Holding Mechanism Lower Cavity 306
Third Tool Holding Mechanism 400
First Type of Upper Cavity 402
Second Type of Upper Cavity 404
Third Tool Holding Mechanism Lower Cavity 406
Fourth Tool Holding Mechanism 500
Fourth Tool Holding Mechanism Upper Cavity 502
Fourth Tool Holding Mechanism Lower Cavity 504
Door Stop Mechanism 600
Hole 602
Screw 604
Stop Handle 606
Stop 608
Hinge 700
First Side 702
Second Side 704
Screw 706
Hinge locking system 800
First Screw 802
Secured Surface 804
Second Screw 806
Nut 808
Tool Wall 900
Wall 902
Tool Holding Mechanism 904
Door 1000

The inventor claims:

1. A tool holding system, comprising:

a first tool holding mechanism, the first tool holding mechanism comprising at least one upper cavity, at least one lower cavity, and a magnetic strip interposed between the at least one upper cavity and the at least one lower cavity, where the magnetic strip is in closer proximity to the lower cavity than the upper cavity, and where the upper and lower cavity have a front and back surface;

where the upper cavity is positioned at an obtuse angle between its front surface and the vertical axis below it; and where the lower cavity extends outwards from the vertical axis;

wherein the first tool holding mechanism can be coupled to a surface of the tool holding system;

a second tool holding mechanism, wherein the second tool holding mechanism comprises an upper cavity and a lower cavity, a third tool holding mechanism, the third tool holding mechanism comprising at least one circular upper cavity, at least one arcuate upper cavity, at least one circular lower cavity, at least one obround lower cavity, at least one upper surface edge, and one lower surface edge, wherein the circular upper cavity and circular lower cavity are enclosed, wherein the arcuate upper cavity is open to the upper surface edge, and wherein the circular upper cavity and the circular lower cavity have a diameter that is smaller than the arcuate upper cavity.

2. The tool holding system of claim 1, wherein the first tool holding mechanism comprises a single sheet of material, the single sheet of material bent to form the angle between the back surface and the top surface and the angle between the back surface and the bottom surface.

3. The tool holding system of claim 1, wherein the at least one upper cavity is configured to receive a diameter of a first side of a tool and the at least one lower cavity is configured to receive a diameter of a second side of the tool.

4. The tool holding system of claim 1, wherein the magnetic strip is configured to be disposed substantially close to the at least one lower cavity.

5. The tool holding system of claim 1, wherein the at least one upper cavity is configured to comprise a plurality of cavities comprising different widths and wherein the at least one lower cavity is configured to comprise a plurality of cavities comprising different widths.

6. The tool holding system of claim 1, wherein the upper cavity comprises a first portion comprising a first diameter and a second portion external to the first portion and comprising a second diameter, and wherein the second diameter is less than the first diameter.

7. The tool holding system of claim 6, wherein the first diameter is configured to be less than a first diameter of a tool, and wherein the second diameter is configured to be greater than a second diameter of a tool at a location next to a portion of the tool comprising the first diameter of the tool.

8. The tool holding system of claim 7, wherein the lower cavity comprises a diameter greater than a third diameter of a third portion of the tool.

9. The tool holding system of claim 1, further comprising a tool box internally housing the surface comprising the first tool holding mechanism.

10. The tool holding system of claim 9, wherein the tool box further comprises at least one door coupled to the tool box using a hinge, and at least one door stop mechanism coupled to the tool box using a plurality of screws.

11. The tool holding system of claim 10, wherein the at least one door stop mechanism comprises a plurality of holes configured to secure the door at a plurality of open angles and wherein the door comprises a spring-assisted stop configured to protrude outward from a side surface of the door and upwards through at least one of the plurality of holes of the door stop mechanism.

12. The tool holding system of claim 11, wherein the door stop mechanism being configured to secure the door at a plurality of open angles comprises the door stop mechanism receiving the stop in one of the plurality of holes.

13. The tool holding system of claim 12, wherein the stop is configured to be controlled by a stop handle disposed internal to the door.

14. The tool holding system of claim 10, wherein the hinge comprises a first side coupled to the tool box and a second side coupled to the door, the tool box comprising an enclosed cavity when the tool box door is closed, and at least one secured surface;

wherein the first and second sides of the hinge comprise:

at least one bolt and one screw securing the first side of the hinge to a surface of the door, where the bolt is secured by a lock nut, and the screw, screws into the secured surface on the interior of the door, the bolts' heads and screws' heads exposed on the exterior of the door surface, and the nuts on the interior side of the tool box cavity, wherein the screw secured by the lock nut can rotate freely once secured, at least one bolt and one screw securing the second side of the hinge to a surface of the tool box, where the bolt is secured by a lock nut, and the screw, screws into secured surface on the interior tool box, the bolts' heads and screws' heads exposed on the exterior of the tool box surface, and the nuts on the interior side of the tool box cavity, wherein the screw secured by the lock nut can rotate freely once secured.

15. The tool holding system of claim 14, where the secured surface has at least two threaded openings sized to receive a screw.

16. The tool holding system of claim 10, wherein the hinge comprises a first side coupled to the tool box, a second side coupled to the door, and wherein the first and second sides of the hinge comprise:

one or more bolts and at least two screws securing the first side of the hinge to a surface of the door, where the bolts are secured by lock nuts, and the screws screw into threaded openings of the secured surface on the interior side of the door, the bolts' heads and screws' heads exposed on the exterior of the door surface, the nuts fixed to the bolts on the interior side of the tool box cavity but not otherwise restricted, one or more bolts and two screws securing the second side of the hinge to a surface of the tool box, where the bolts are secured by lock nuts, and the screws screw into threaded openings of the secured surface on the interior side of the tool box, the bolts' heads and screws' heads exposed on the exterior of the tool box, the nuts fixed to the bolts on the interior side of the tool box cavity but not otherwise restricted.

17. The tool holding system of claim 16, where the secured surface is a separate member held affixed only by the bolts and screws.

* * * * *